United States Patent
Saini et al.

(10) Patent No.: US 12,435,263 B2
(45) Date of Patent: Oct. 7, 2025

(54) TREATMENT FLUIDS FOR ACID STIMULATION OPERATIONS AND METHODS RELATED THERETO

(71) Applicant: SAUDI ARABIAN OIL COMPANY, Dhahran (SA)

(72) Inventors: Rajesh Kumar Saini, Cypress, TX (US); Mohammed Sayed, Katy, TX (US); Amy J. Cairns, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/664,761

(22) Filed: May 15, 2024

(65) Prior Publication Data

US 2025/0163314 A1 May 22, 2025

Related U.S. Application Data

(60) Provisional application No. 63/601,653, filed on Nov. 21, 2023.

(51) Int. Cl.
*C09K 8/74* (2006.01)
*E21B 43/16* (2006.01)
*E21B 43/26* (2006.01)

(52) U.S. Cl.
CPC ............... *C09K 8/74* (2013.01); *E21B 43/16* (2013.01); *E21B 43/26* (2013.01)

(58) Field of Classification Search
CPC ............ C09K 8/74; E21B 43/26; E21B 43/16
See application file for complete search history.

(56) References Cited

U.S. PATENT DOCUMENTS

| | | | | |
|---|---|---|---|---|
| 2010/0071957 A1* | 3/2010 | Huang | ............... | C09K 8/12 175/65 |
| 2017/0152432 A1* | 6/2017 | Vo | ............... | E21B 43/25 |
| 2017/0362489 A1* | 12/2017 | Jackson | ............... | C09K 8/68 |
| 2018/0244980 A1* | 8/2018 | Daeffler | ............... | C09K 8/602 |
| 2019/0382649 A1* | 12/2019 | Jiang | ............... | C09K 8/72 |
| 2020/0270514 A1* | 8/2020 | Gomaa | ............... | E21B 43/26 |

OTHER PUBLICATIONS

Dasgupta et al., "Reservoir characterization of Permian Khuff-C carbonate in the supergiant Ghawar field of Saudi Arabia," The Leading Edge 20(7), 706-717, 2001.
Rae et al., "Matrix acid stimulation—A review of the art," SPE 82260, 2003, 11 pages.
Penny et al., "The application of microemulsion additives in drilling and stimulation results in enhanced gas production," SPE 94274, 2005, 9 pages.
Longeron et al., "Drilling fluids filtration and permeability impairment: Performance evaluation of various mud formulations," SPE 48988, 1998, 15 pages.
Culec, "Effect of drilling fluids on rock surface properties" SPE 15707, 1989, 7 pages.
Audibert-Hayet et al., "Surfactant system for water-based well fluids," Colloidal and Surfaces A: Physicochem. Eng. Aspects vol. 288 (1), 113-120 (2006).
Cawiezel et al., "The selection and optimization of a surfactant package to maximize cleanup of high-density fracturing fluid," SPE 136812-MS, 2010, 11 pages.
Kaufman et al., "Critical Evaluations of Additives Used in Shale Slickwater Fracs," SPE 119900, 2008, 9 pages.
Galindo et al., "Evaluation of environmentally acceptable surfactants for application as flowback aids," SPE 164122, 2013, 12 pages.
Zhang et al., "Unique flow-back chemistry for enhancing productivity of low permeability reservoir," IADC/SPE 155505, 2012, 8 pages.
Al-Anazi et al., "Use of nanoemulsion surfactants during hydraulic fracturing treatments," SPE-171911-MS, 2014, 15 pages.
Mahmoudkhani et al., "Microemulsion as flowback aids for enhanced oil and gas recovery after fracturing, myth or reality: A turnkey study to determine the features and benefits," SPE-173729-MS, 2015, 21 pages.
Kim et al., "Choosing Surfactants for the Eagle Ford Shale Formation: Guidelines for Maximizing Flowback and Initial Oil Recovery," SPE-180227-MS, 2016, 12 pages.
Himes et al., "Improved Method to Evaluate Flowback Additives for Frac Fluids Used in Unconventional Reservoirs," SPE-187200-MS, 2017, 14 pages.
Nelson et al., "A novel high throughput screening approach for flowback aid optimization," SPE-189552-MS, 2018, 15 pages.
Yue et al., "Multifunctional fracturing additives as flowback aids," SPE-181383-MS, 2016, 11 pages.

\* cited by examiner

*Primary Examiner* — Silvana C Runyan
(74) *Attorney, Agent, or Firm* — Vorys, Sater, Seymour and Pease LLP

(57) ABSTRACT

Treatment fluids for acid stimulation operations and methods related thereto. Treatment fluids comprise: an aqueous acid solution comprising a mineral acid and an organic acid; and a retardation additive comprising: 1-15 wt % of an oleaginous liquid; 5-30 wt % of a fatty alkyl alcohol ethoxylate; 2-40 wt % of at least one of a fatty alkyl ethoxylated ammonium salt, a zwitterionic surfactant, an alkyl ether sulfate salt, or an alkyl ether sulfonate salt; 4-30 wt % of a co-solvent; and 10-85 wt % of an aqueous fluid, each wt % based on a total mass of the retardation additive. Treatment fluids or retardation additives may be oil-in-water emulsions. Treatment fluids may have 0.5-5 gallons per thousand, based on an overall volume of the treatment fluid of the retardation additive. Methods comprise providing and introducing the treatment fluid into a subterranean formation during a stimulation operation.

9 Claims, No Drawings

TREATMENT FLUIDS FOR ACID STIMULATION OPERATIONS AND METHODS RELATED THERETO

FIELD OF THE DISCLOSURE

The present disclosure relates generally to hydrocarbon reservoir stimulation.

BACKGROUND OF THE DISCLOSURE

Reservoir stimulation may be performed on a subterranean reservoir to achieve, increase, or restore fluid production therefrom, such as hydrocarbons including oil and gas. Reservoir stimulation operations include matrix acidizing, fracturing, and acid fracturing as nonlimiting examples. The type of stimulation operation employed in a particular circumstance may depend on factors including the geology of the formation and the type of hydrocarbons being produced.

Reservoirs targeted for stimulation operations may include varying permeability carbonate reservoirs, typically comprising calcite and/or dolomite, optionally in combination with other minerals. Tight carbonate reservoirs may exhibit high temperatures, low to medium porosity, variable reservoir properties, and highly heterogeneous lithology. Tight carbonate reservoirs may benefit greatly from stimulation operations, such as matrix acidizing or acid fracturing, to increase production therefrom. During matrix acidizing operations, mineral acids or organic acids are used to dissolve a portion of the carbonate matrix to form passages (wormholes) through which a hydrocarbon resource may flow. Matrix acidizing operations are conducted below the fracture gradient pressure (i.e., the pressure above which injection of fluids will cause a formation to fracture hydraulically) of the carbonate reservoir. Acid fracturing is conducted above the fracture gradient pressure of the carbonate reservoir to create or extend a plurality of fractures into the carbonate matrix, which may be held open by proppant particulates once the pressure is released. The acid may continue to erode the fractures or expand wormholes extending therefrom to increase production.

A high-density calcium or magnesium brine may be formed as a result of dissolution of the carbonate matrix during matrix acidizing or acid fracturing. The brine may take a considerable time to flow back to the surface due to its density, and a considerable volume (e.g., 60-90% in tight carbonate formations) of the stimulation fluid introduced to the reservoir may remain downhole. The brine may block wormholes and pore space within the carbonate reservoir and limit production by impeding the flow of oil or gas therethrough. Limited brine production may be especially problematic in low-pressure carbonate reservoirs and reservoirs containing multi-lateral wells.

Foaming may be utilized to facilitate production of stimulation fluids following an acidizing operation or an acid fracturing operation. Gases suitable for promoting foam formation within a stimulation fluid include, for example, nitrogen or carbon dioxide. A polymer may be present to facilitate the foaming process. However, excessive polymer loading within a stimulation fluid may result in plugging the porosity within the carbonate reservoir. Moreover, high surface tension (interfacial tension) values resulting from use of a polymer may limit fluid production as well.

Another approach for facilitating production following a stimulation operation is to utilize a microemulsion containing one or more surfactants during the stimulation operation. The microemulsion may decrease surface tension and modify the contact angle within the carbonate reservoir, thereby allowing production to take place more easily. Unfortunately, surfactant chemistry is not universally compatible with the conditions typically encountered in all carbonate reservoirs. For example, some surfactants may not promote emulsification at the high temperatures found in many carbonate reservoirs. Moreover, many surfactants are incompatible with the acids used during stimulation, and some surfactants are incompatible with each other when blended together. Large volumes of stimulation fluid may be needed in many instances to account for the decreased surfactant performance resulting from surfactant incompatibility or degradation.

In view of the foregoing, stimulation fluids exhibiting enhanced production following introduction to a carbonate reservoir are highly desired.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting example method of the present disclosure may include: providing a treatment fluid comprising: an aqueous acid solution comprising a mineral acid and an organic acid; and a retardation additive, wherein the retardation additive comprises: 1 wt % to 15 wt % of an oleaginous liquid; 5 wt % to 30 wt % of a fatty alkyl alcohol ethoxylate; 2 wt % to 40 wt % of at least one of a fatty alkyl ethoxylated ammonium salt, a zwitterionic surfactant, an alkyl ether sulfate salt, or an alkyl ether sulfonate salt; 4 wt % to 30 wt % of a co-solvent; and 10 wt % to 85 wt % of an aqueous fluid, each wt % based on a total mass of the retardation additive; and introducing the treatment fluid into a subterranean formation during a stimulation operation.

A first nonlimiting example treatment fluid of the present disclosure may include: an aqueous acid solution comprising a mineral acid and an organic acid; and a retardation additive, wherein the retardation additive comprises: 1 wt % to 15 wt % of an oleaginous liquid; 5 wt % to 30 wt % of a fatty alkyl alcohol ethoxylate; 2 wt % to 40 wt % of at least one of a fatty alkyl ethoxylated ammonium salt, a zwitterionic surfactant, an alkyl ether sulfate salt, or an alkyl ether sulfonate salt; 4 wt % to 30 wt % of a co-solvent; and 10 wt % to 85 wt % of an aqueous fluid, each wt % based on a total mass of the retardation additive.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to hydrocarbon reservoir stimulation.

The present disclosure may include compositions and methods related to retardation additives for use in hydrocarbon reservoir stimulation. Compositions of the present disclosure may provide advantages over those conventionally used in subterranean stimulation operations, including increased stability to temperature and acidic conditions, improved formation permeability, increased recovery of hydrocarbons following stimulation, increased production of spent stimulation fluid, retardation of acid activity (matrix dissolution rate) to afford more feasible use and deeper matrix penetration during stimulation, and decreased treatment fluid volumes during stimulation, which may afford various economic and environmental advantages. Retardation additive compositions of the present disclosure may comprise a blend of components that accomplish one or more of the foregoing once combined with an aqueous acid and introduced to a carbonate reservoir. Advantageously, the blend of components may be pre-formulated for later combination on an as-needed basis with an appropriate aqueous acid to perform a desired type of stimulation operation in a given carbonate reservoir. Additional details regarding the various components that may be present in the retardation additive compositions of the present disclosure, as well as aqueous acids or other aqueous fluids suitable for combining therewith, are specified below. It should be noted that "retardation additive," "retardation additive compositions," and grammatical variations thereof, as used herein, may refer to a composition for use in treatment fluids that may convey various functions beyond retardation of acid activity, such as, for example, including, but not limited to, formation permeability modification, increased treatment fluid flowback, the like, or any combination thereof. Some functions of retardation additive compositions are discussed herein below.

Advantageously, the various surfactants present within retardation additive compositions are compatible with each other, thus allowing a blend of the various components to be pre-formulated together prior to being combined with an aqueous acid or other aqueous fluid. Furthermore, retardation additive compositions of the present disclosure may advantageously form microemulsions when formulated as a treatment fluid, which may facilitate their use in subterranean treatment operations, such as stimulation of a carbonate reservoir. Advantageously, the emulsions may maintain stability under a wide range of conditions commonly encountered in a carbonate reservoir. Low surface tension values (e.g., about 31 mN/m or less, as measured against air) may be realized as well, which may likewise facilitate introduction to and production from a subterranean formation. In addition, treatment fluids including retardation additive compositions of the present disclosure may be foamed, if desired. All of the foregoing may aid in promoting fluid recovery once a stimulation operation has taken place.

Without being limited by theory or mechanism, low surface tension values are believed to afford decreased capillary pressure within a subterranean formation. Decreased capillary pressure, in turn, may allow for improved fluid recovery of treatment fluids or a spent variant thereof through a reduction in the force needed to promote fluid flow within a subterranean formation. As used herein, capillary pressure may be calculated according to Equation 1 below $$P_c = \frac{\gamma \cos(\theta)}{d} \quad \text{Equation 1}$$

where $\gamma$ is the surface tension of a composition in mN/m or Dyne/cm relative to air, $\cos(\theta)$ is the cosine of contact angle between the rock, fluid and gas, and d is the diameter of pores in mm. The unit of capillary pressure Pc is Pascal. When introduced to a subterranean formation within a treatment fluid, retardation additive compositions of the present disclosure may mitigate or eliminate the formation of water blocks, which may otherwise obstruct flow back to the wellhead.

Furthermore, retardation additive compositions of the present disclosure may increase retardation of acid activity when used with an acid in a treatment operation for a subterranean formation. Without being bound by theory, retardation additive compositions of the present disclosure may decrease activity of acid within the subterranean formation due to molecular interactions between retardation additive compositions and minerals of subterranean formations. Such decreased acid activity may allow for increased efficiency of treatment operations due to lengthened ability of reaction of acids with a subterranean formation, thereby increasing depth and/or length of wormholes formed during a stimulation operation and/or thereby increasing the degree of surface etching in the created fracture surface formed during a stimulation operation. Furthermore, retardation additives of the present disclosure may allow for formation and use of treatment fluids having lower quantities of organic aqueous acids. As organic acids may generally be costly, retardation additives of the present disclosure may enable at least partial substitution of organic acids in a treatment fluid with mineral acids, thus maintaining acid effectiveness while reducing material cost.

As a further advantage, the retardation additive compositions of the present disclosure may undergo limited emulsion formation with hydrocarbons (condensate) within a wellbore, when formulated within a treatment fluid. That is, treatment fluids including retardation additive compositions of the present disclosure may be readily introduced to a subterranean formation in emulsified form and once contacted with condensate, the emulsion may break. Spontaneous breaking of the emulsions under the subterranean conditions may facilitate production of hydrocarbons from the formation, whereas production of an emulsion may be more difficult and require extensive processing to recover the hydrocarbons therefrom. In addition, this feature may facilitate more efficient usage of the treatment fluids to promote stimulation downhole.

Retardation additive compositions of the present disclosure may comprise an oleaginous liquid; a fatty alkyl alcohol ethoxylate; at least one of a fatty alkyl ethoxylated ammonium salt (a cationic surfactant), a zwitterionic surfactant, an alkyl ether sulfate salt (an anionic surfactant), or an alkyl ether sulfonate salt (an anionic surfactant); and a co-solvent (or mixture of co-solvents). Suitable examples of these components are discussed in further detail below.

Suitable oleaginous liquids may promote formation of an oil-in-water emulsion when the retardation additive compositions are mixed with an aqueous fluid, optionally, in combination with other components (e.g., within a treatment fluid). Double or triple emulsions may also be formed. Suitable oleaginous liquids include, for example, terpenes (e.g., D-limonene, lemon oil, pine oil, and the like), hydrocarbons (e.g., toluene, xylene, diesel, mineral oil, and the like), fatty alkyl esters, and the like. Suitable fatty alkyl esters may include a $C_6$-$C_{30}$ fatty acid component and a $C_1$-$C_{24}$, or $C_1$-$C_{12}$, or $C_1$-$C_6$ alcohol components, such as a methyl ester of a $C_6$-$C_{30}$ fatty acid. Examples of suitable oleaginous liquids include HFS-10 (available from EVA-LANCE) or STEPAN® C-25 and C-65 (available from the Stepan Company).

Suitable fatty alkyl alcohol ethoxylates may comprise a linear or branched $C_6$-$C_{15}$ alcohol ethoxylate comprising 3 to 30 ethoxylate repeat units. The fatty alcohol may be a primary, secondary, or tertiary alcohol, with the ethoxylate repeat units extending from the alcohol group. Example fatty alcohol ethoxylates include TERGITOL™ 15-S-7 and 15-S-9 (available from Dow Chemical), and BIO-SOFT® N91-6 (available from the Stepan Company). When combined with an aqueous fluid in combination with other components, the fatty alcohol ethoxylate may serve as a neutral surfactant and decrease surface tension of compositions of the present disclosure. The fatty alcohol ethoxylate also may serve as a demulsifier and prevent formation of and/or break existing water-in-oil emulsions that may generally be formed with hydrocarbon (e.g., crude oil) and/or condensate when aqueous fluid comes in contact with the hydrocarbon and/or condensate. Preferred fatty alcohol ethoxylates may generally have a hydrophilic-lipophilic balance (HLB) between about 8 to about 14, as compositions with HLB values in the aforementioned range may have increased capacity for preventing formation of and/or breaking existing water-in-oil emulsion(s).

In some embodiments, retardation additive compositions may comprise at least a fatty alkyl ethoxylated ammonium salt. Suitable fatty alkyl ethoxylated ammonium salts may comprise at least one functionalized alkyl group comprising 3 to 30 ethoxylate repeat units. In nonlimiting examples, suitable ethoxylated ammonium salts may comprise one or two functionalized alkyl groups comprising 3 to 30 ethoxylate repeat units and two or three linear or branched $C_1$-$C_{24}$ alkyl groups. Such ethoxylated ammonium salts may function as a cationic surfactant when the retardation additive compositions are combined with an aqueous fluid in combination with other components. Example ethoxylated ammonium salts include ETHOQUAD® C/25 (available from Nouryon) (cocoalkylmethyl[polyoxyethylene (15)]ammonium chloride).

In some embodiments, the retardation additive compositions may comprise at least a zwitterionic surfactant. Suitable zwitterionic surfactants may include betaines and sultaines. The zwitterionic surfactant may be selected in order to convey stability of the retardation additive compositions toward high temperatures (greater than 200° F.), high saline environments (greater than 5 wt % total dissolved solids), and low pH values (pH of 3 or less). Suitable zwitterionic surfactants may comprise $C_{12}$-$C_{15}$ betaines, which may comprise a positively charged amine group and a negatively charged carboxylate group. Zwitterionic surfactants of these types may include cocoamidopropyl betaine, laurylamidopropyl betaine, and the like. Suitable zwitterionic surfactants may also comprise $C_{12}$-$C_{15}$ sultaines, which may comprise a positively charged amine group and a negatively charged sulfonic acid group. Zwitterionic surfactants of these types may include lauramidopropyl hydroxysultaine, cocoamido hydroxysultaine, tallowamidopropyl hydroxysultaine, and the like. Example zwitterionic surfactants that are betaines include PETROSTEP® B-1235 and PETROSTEP® LME-50 (available from the Stepan Company).

In some embodiments, the retardation additive compositions may comprise at least an alkyl ether sulfate salt or an alkyl ether sulfonate salt, preferably an alkyl ether sulfate ammonium salt or an alkyl ether sulfonate ammonium salt. Alkali metal salts of alkyl ether sulfates or alkyl ether sulfonates may also be suitable. These types of compounds are anionic surfactants. Suitable alkyl ether sulfate or sulfonate salts may comprise a linear or branched $C_6$-$C_{18}$ alcohol reacted with 2 to 30 ethoxylate repeat units, with the terminal alcohol group functionalized with a sulfate or sulfonate head group. A cation, preferably ammonium, may balance the charge of the sulfate or sulfonate head group. Example alkyl ether sulfate salts and alkyl ether sulfonate salts of these types include PETROSTEP® ES-65A (available from the Stepan Company) and alpha olefin sulfonate ethers.

More than one surfactant selected from the fatty alkyl ethoxylated ammonium salt, the zwitterionic surfactant, the alkyl ether sulfate salt, or the alkyl ether sulfonate salt, may be present in some cases. For example, retardation additive compositions may comprise at least two of the fatty alkyl ethoxylated ammonium salt, the zwitterionic surfactant, the alkyl ether sulfate salt, or the alkyl ether sulfonate salt, wherein at least two different types of surfactants are chosen from among the selected groups (e.g., a fatty alkyl ethoxylated ammonium salt and a zwitterionic surfactant, or a fatty alkyl ethoxylate ammonium salt and an alkyl ether sulfate salt or an alkyl ether sulfonate salt).

Suitable co-solvents include short-chain monohydric, dihydric, or polyhydric alcohols, esterified or partially esterified forms thereof, or etherified or partially etherified forms thereof, which may be miscible, immiscible, or partially immiscible with water. The co-solvent may aid in solvating various components of the retardation additive compositions, optionally further aided by the oleaginous liquid. Suitable co-solvents may include alcohols, glycols, glycol ethers, and glycol esters. In more specific examples, suitable co-solvents may preferably have an alkyl chain length of $C_3$-$C_8$. Example co-solvents that may be suitable include, for instance, methanol, ethanol, isopropanol, butanol, ethylene glycol, propylene glycol, propylene glycol methyl ether, and the like.

Retardation additive compositions of the present disclosure may further comprise an aqueous fluid. When including an aqueous fluid, retardation additive compositions of the present disclosure may be emulsified or non-emulsified, depending on the conditions to which the retardation additive compositions are exposed. Preferably, retardation additive compositions comprising an aqueous fluid are emulsified.

Compositions of the present disclosure (including retardation additive compositions having therein the above-described components) may be provided as a blend, which may be stored for further use or immediately combined with an aqueous fluid.

Suitable aqueous fluids for inclusion in any compositions of the present disclosure may include, but are not limited to, fresh water (e.g., stream water, lake water, or municipal treated water), non-potable water such as gray water or industrial process water, sea water, brine, aqueous salt solutions, partially desalinated water, produced water (including brine and other salt water solutions), or any combination thereof.

When present in the retardation additive compositions (either in emulsified or non-emulsified form), the aqueous fluid may comprise, for example, 10 wt % to 85 wt % (or 10 wt % to 80 wt %, or 30 wt % to 80 wt %, or 30 wt % to 50 wt %, or 50 wt % to 70 wt %, or 50 wt % to 80 wt %, or 60 wt % to 80 wt %) of the retardation additive composition, based on total mass of the retardation additive composition, including the aqueous fluid and the various components discussed above. Various components of retardation additive compositions of the present disclosure may, for example, be present in the following weight percentage ranges, with each weight percentage being based on total mass of the retardation additive composition, including the aqueous fluid: 1 wt % to 15 wt % of the oleaginous liquid, 5 wt % to 30 wt % of the fatty alkyl alcohol ethoxylate, 2 wt % to 40 wt % (or 2 wt % to 30 wt %, or 5 wt % to 40 wt %) of at least one of the fatty alkyl ethoxylated ammonium salt, the zwitterionic surfactant, the alkyl ether sulfate salt, or the alkyl ether sulfonate salt, and 4 wt % to 30 wt % of the co-solvent.

Retardation additive compositions of the present disclosure may be included, along with other additives, in a treatment fluid suitable for performing a subterranean stimulation operation. The term "treatment fluid," and grammatical variants thereof, refers to any fluid that may be used in a subterranean treatment operation (also referred to simply as "treatment" or "operation" herein) in conjunction with a desired function and/or for a desired purpose. The term "treatment fluid" does not imply any particular action by the fluid or any component thereof. Suitable stimulation operations that may be promoted by a treatment fluid include, but are not limited to, matrix acidizing, fracturing, acid fracturing, the like, or any combination thereof.

Compositions of the present disclosure (e.g., treatment fluids or retardation additive compositions therein) may each be emulsified. An aqueous fluid may support emulsion formation by providing a continuous phase for emulsification of immiscible components, such as the oleaginous liquid, for example. The emulsion formed may, thus, define an oil-in-water emulsion. The oleaginous liquid may comprise the "oil" phase of the emulsion and the aqueous fluid may comprise the "water" phase of the emulsion.

Without being bound by theory, emulsions may be formed due to molecular interactions between the solvents and aqueous fluids present in the compositions. Various surfactants and/or other components supplied as part of the compositions may promote the formation of and/or stabilize the emulsion. The emulsion may be formed by mixing the various components together in an aqueous fluid and agitating to form the emulsion. In nonlimiting examples, mixing may be performed in a mixing tank, blender, homogenizer, static mixer, or using any other suitable mixing technique or device known to persons having ordinary skill in the art.

Emulsified compositions of the present disclosure may comprise a microemulsion or a nanoemulsion. As used herein, "microemulsion" refers to an emulsion with particles that generally have an approximate average particle size from 0.3 μm (micrometers)(or 300 nm) to 10 μm, while a "nanoemulsion" refers to an emulsion with particles that generally have an approximate average particle size from 1 nm (nanometers) to 300 nm. It should be noted that microemulsions and nanoemulsions may refer to the same type of emulsion, i.e. oil-in-water emulsion, depending on the particle size. Emulsions of the present disclosure may have an average particle size ranging from 3 nm to 5000 nm, or 50 nm to 500 nm, or 100 nm to 500 nm, or 50 nm to 600 nm, or 100 nm to 600 nm, or 500 nm to 1000 nm, or 500 nm to 2000 nm, or 500 nm to 3000 nm, or 1000 nm to 3000 nm, or 1000 nm to 5000 nm. Average particle size in the emulsion may be measured using a particle size analyzer capable of analyzing liquid emulsion particle sizes.

Treatment fluids of the present disclosure may further include an acid, such as aqueous mineral acids and/or aqueous organic acids, including, but not limited to, aqueous solutions of: hydrochloric acid, hydrobromic acid, formic acid, acetic acid, propionic acid, methanesulfonic acid, glutamic acid diacetate (GLDA), chloroacetic acid (e.g., mono-chloroacetic acid, dichloroacetic acid, and trichloroacetic acid), trifluoroacetic acid, the like, or any combination thereof. Any acid suitable for use in the disclosure herein may be able to generate a pH of two (2) or lower when present in the compositions in a suitable amount.

Preferred aqueous acid solutions may comprise a mineral acid (e.g., hydrochloric acid) and an organic acid (e.g., methanesulfonic acid, glutamic acid diacetate (GLDA), the like, or any combination thereof). It should be noted that suitable GLDA for use in accordance with the present disclosure may be purchased from various sources including, but not limited to, Nouryon Chemical Company and may be sold under the trade name DISSOLVINE®. Furthermore, it should be noted that sodium salt of GLDA (e.g., tetra sodium salt (GLDA-$Na_4$)) may be preferred for use in aqueous acid solutions of the present disclosure.

The mineral acid and the organic acid may be supplied as a mineral acid solution and an organic acid solution, respectively. The mineral acid and the organic acid may be included in aqueous acid solutions of the present disclosure at a ratio of hydrochloric acid to organic acid from 9:1 to 1:1, or 9:1 to 1.5:1, or 9:1 to 4:1, or 4:1 to 1.5:1, or 4:1 to 1:1, or about 1:1, or about 1.5:1, or about 4:1, or about 9:1, by volumes of the mineral acid solution and the organic acid solution.

Individual aqueous acid solutions (e.g., a hydrochloric acid solution, an organic acid solution, the like, or any combination thereof) may be combined with any aqueous fluids obtained from any of the other foregoing aqueous fluid sources as well. Suitable individual aqueous acid solutions may have any suitable acid concentration including an acid concentration ranging from 5 wt % to 80 wt %, 5 wt % to 70 wt %, or 60 wt % to 80 wt %, or 65 wt % to 80 wt %, or 65 wt % to 75 wt %, or 5 wt % to 50 wt %, or 10 wt % to 40 wt %, or 5 wt % to 25 wt %, or 10 wt % to 80 wt %, or 10 wt % to 30 wt %, based on total mass of the aqueous acid solution. Preferred mineral acid solutions may have an acid concentration ranging from 5 wt % to 35 wt %, or 10 wt % to 28 wt %. Preferred organic acid solutions may have an acid concentration ranging from 10 wt % to 60 wt %, or 20 wt % to 54 wt %.

In an embodiment of the present disclosure, a nonlimiting example aqueous acid solution may include about 31 wt % hydrochloric acid solution and about 70 wt % methanesulfonic acid in a 1:1 volumetric ratio, though it should be noted that other concentrations of acid solutions may be used and other ratios of mineral acid solution to organic acid solution may be used in accordance with the present disclosure, such as, for example, a ratio of hydrochloric acid to methanesulfonic acid from 10:1 to 1:10, or, in another example, a ratio of hydrochloric acid to methanesulfonic acid of about 4:1, wherein the ratios are volumetric ratios.

In another embodiment of the present disclosure, a nonlimiting example aqueous acid solution may include about 28 wt % hydrochloric acid solution and about 54 wt % GLDA in an about 1:1 volumetric ratio. In another embodiment of the present disclosure, a nonlimiting example aqueous acid solution may include about 28 wt % hydrochloric acid solution and about 38 wt % GLDA in a 1:1 volumetric ratio. It should be noted that other concentrations of acid solutions may be used, and other ratios of mineral acid solution to organic acid solution may be used in accordance with the present disclosure, such as, for example, a ratio of hydrochloric acid to GLDA from 10:1 to 1:10, or, in another example, a ratio of hydrochloric acid to GLDA from 9:1 to 1:1, wherein the ratios are volumetric ratios.

Treatment fluids of the present disclosure may be formulated by combining a suitable aqueous acid solution and a retardation additive described herein over a range of concentrations suitable to perform a desired stimulation operation. The volume concentration of the retardation additive in the treatment fluid may, based on the overall volume of the treatment fluid, range from 0.5 gpt (gallons per thousand) to 5 gpt, or 1 gpt to 2 gpt, or 2 gpt to 4 gpt, or 2 gpt to 5 gpt, or even greater than 5 gpt.

The treatment fluids described herein may further include one or more additional components suitable for achieving one or more desired functions (e.g., in addition to the stimulation operation in question), provided that the one or more additional components do not adversely affect the function of treatment fluids described herein. Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an iron control agent, the like, or any combination thereof. Suitable examples of the foregoing will be familiar to one having ordinary skill in the art.

Compositions of the present disclosure may be formulated as a main treatment fluid for introduction to a subterranean formation, or the compositions may be formulated as a pad fluid. As used herein, a "pad fluid" refers to a small-volume treatment fluid that contains at least some of the components present in a main treatment fluid (commonly a larger-volume of main treatment fluid) to follow the pad fluid. For example, during a fracturing operation, a pad fluid comprising all components except for proppant particulates may precede a subsequently introduced fracturing fluid containing proppant particulates. Thus, for example, in the present disclosure, a pad fluid comprising an aqueous acid and a retardation additive may precede an acid fracturing fluid comprising the aqueous acid, the retardation additive, and a plurality of proppant particulates.

In some embodiments, the treatment fluids described herein may be foamed. For example, certain treatment fluids described herein may comprise a foamed acid fracturing fluid or a foamed matrix acidizing fluid. A gas component or a foaming agent (a component that forms a gas under specified conditions) may be injected into the treatment fluid in order to form a foam, before flowing the treatment fluid into a subterranean formation as part of a reservoir stimulation operation. Alternately, foam formation may take place downhole. Suitable gases to promote foaming may include, but are not limited to, nitrogen ($N_2$), carbon dioxide ($CO_2$), the like, or any combination thereof. Foaming agents may generate these gases or others under the specified conditions. Introduction of the gas or foaming agent into the treatment fluid may be carried out in any suitable means known in the art. Suitable foaming agents will also be familiar to persons having ordinary skill in the art.

In some or other embodiments, treatment fluids of the present disclosure may be gelled or emulsified. Gelled treatment fluids may comprise a polymer to promote gelling, wherein the gel may comprise a linear gel or a crosslinked polymer gel.

Accordingly, treatment methods of the present disclosure may comprise providing a treatment fluid comprising: an aqueous acid solution comprising a mineral acid and an organic acid; a retardation additive, wherein the retardation additive comprises; 1 wt % to 15 wt % of the oleaginous liquid; 5 wt % to 30 wt % of the fatty alkyl alcohol ethoxylate; 2 wt % to 40 wt % of at least one of the fatty alkyl ethoxylated ammonium salts, the zwitterionic surfactant, the alkyl ether sulfate salt, or the alkyl ether sulfonate salt; and 4 wt % to 30 wt % of the co-solvent; and 30 wt % to 80 wt % of an aqueous fluid, each wt % based on a total mass of the retardation additive; and introducing the treatment fluid into a subterranean formation during a stimulation operation. The treatment fluid may be emulsified when introduced into the subterranean formation and may optionally be foamed.

Suitable stimulation operations that may be performed with the treatment fluids may include, for example, fracturing, acid fracturing, matrix acidizing, or any combination thereof. The treatment fluids may also be used in conjunction with scale dissolution operations as well. The treatment fluids of the present disclosure may allow for provision of one or more of the aforementioned functions simultaneously, allowing for a single stage reservoir stimulation operation to be carried out where, conventionally, multiple stages of reservoir stimulation may have been required. No special mixing or equipment requirements are believed to be needed for preparation and use of the treatment fluids described herein.

The stimulation operations may be conducted in a subterranean formation comprising a carbonate reservoir. When performing matrix acidizing upon a carbonate reservoir, the various components of the treatment fluid may slow the reaction of the aqueous acid with the carbonate matrix, thereby encouraging generation of wormholes rather than bulk erosion of the surface of the formation matrix. Whereas wormhole formation may facilitate increased hydrocarbon production, surface erosion generally does not. When undergoing acid fracturing within a carbonate reservoir, treatment fluid may slow the reaction of the aqueous acid with the carbonate matrix, thereby encouraging the creation of an etched surface and conductive fracture that extends away from the wellbore. Thus, during matrix acidizing and/or acid fracturing operations, the treatment fluids described herein may facilitate use of smaller quantities of acid in conjunction with promoting deeper penetration into the formation matrix. Deeper matrix penetration may occur even when the treatment fluids are in non-emulsified form. The foregoing may decrease treatment and production costs, as well as afford environmental benefits. On-the-fly production of the treatment fluids may occur in some cases, particularly when the treatment fluid is in non-emulsified form.

In some embodiments of the present disclosure, the reservoir stimulation operation may comprise matrix acidizing. During the matrix acidizing operation, acid-soluble material in the subterranean formation may be dissolved by the treatment fluid. Injection as part of the matrix acidizing operation may occur while the formation is subjected to pressures lower than the fracture gradient pressure. After at least partial spending of the aqueous acid in the treatment fluid, the other components in the treatment fluid may then aid in the flowback of a heavy brine produced through dissolution of the formation matrix.

In some embodiments of the present disclosure, the reservoir stimulation operation may comprise acid fracturing. Acid fracturing comprises fracturing the formation and dissolving acid-soluble material of the formation, wherein the treatment fluid is introduced at a pressure higher than the fracture gradient pressure of the formation in order to simultaneously fracture and dissolve portions of the formation using the treatment fluid. Following fracturing, the other components in the treatment fluid may then aid in the flowback of a heavy brine produced through dissolution of the formation matrix.

In some embodiments, the treatment fluids disclosed herein (including mixing of individual components or mixtures thereof, i.e., within the retardation additive) may be mixed at a remote location from a job site and shipped thereto or, in other embodiments, the treatment fluids may be mixed at a job site. In still other embodiments, the treatment fluid may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling treatment fluids for use in stimulation operations of the present disclosure may include one or more mixing and/or storage tanks used for mixing and/or storing, respectively, treatment fluids prior to use in a stimulation operation. Additional tanks may be used for storing spent or partially spent treatment fluid removed from a subterranean formation as part of a stimulation operation.

Systems for introduction of treatment fluids to a wellbore in conjunction with a stimulation operation may comprise a pump fluidly coupled to a tubing, the tubing located at least partially within the wellbore and the tubing containing a treatment fluid for a desired stimulation operation. The "pump" described herein may comprise a single pump or may comprise one or more pump(s) in any combination. Given the benefit of the present disclosure, one having ordinary skill in the art will be able to select an appropriate pump or combination of pumps for a given stimulation operation.

The treatment fluids of the present disclosure may be injected using the pump(s) into the subterranean formation using the tubing located within the wellbore. The treatment fluid used in a particular stimulation operation may flow downhole through the tubing and flow out of the tubing into the subterranean formation in order to carry out the stimulation operation. Subsequently, in some stimulation operations including matrix acidizing and acid fracturing, the treatment fluid of a particular stimulation operation may be flowed back to the wellhead along with residual components which may include, for example, the acid-soluble material dissolved from the formation matrix during an acidizing operation. The treatment fluid and residual components may flow through the tubing or the wellbore annulus and back to the wellhead.

It should be noted that additional nonlimiting components may be present in systems suitable to introduce the treatment fluids to a subterranean formation and to recover fluid from the subterranean formation following stimulation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, the like, or any combination thereof.

Embodiments disclosed herein include:

Embodiment 1. A method comprising: providing a treatment fluid comprising: an aqueous acid solution comprising a mineral acid and an organic acid; and a retardation additive, wherein the retardation additive comprises: 1 wt % to 15 wt % of an oleaginous liquid; 5 wt % to 30 wt % of a fatty alkyl alcohol ethoxylate; 2 wt % to 40 wt % of at least one of a fatty alkyl ethoxylated ammonium salt, a zwitterionic surfactant, an alkyl ether sulfate salt, or an alkyl ether sulfonate salt; 4 wt % to 30 wt % of a co-solvent; and 10 wt % to 85 wt % of an aqueous fluid, each wt % based on a total mass of the retardation additive; and introducing the treatment fluid into a subterranean formation during a stimulation operation.

Embodiment 2. The method of Embodiment 1, wherein the mineral acid comprises 10 wt % to 30 wt % hydrochloric acid solution, by total weight of the hydrochloric acid solution.

Embodiment 3. The method of Embodiment 1 or 2, wherein the organic acid comprises methane sulfonic acid, glutamic acid diacetate, or any combination thereof.

Embodiment 4. The method of any one of Embodiments 1-3, wherein the organic acid comprises an organic acid solution with an acid concentration of 10 wt % to 80 wt %, by total weight of the organic acid solution.

Embodiment 5. The method of any one of Embodiments 1-4, wherein the mineral acid comprises a mineral acid solution and the organic acid comprises an organic acid solution, and wherein the mineral acid solution and the organic acid solution are in a ratio of 9:1 to 1:1, by volume of the solutions.

Embodiment 6. The method of Embodiment 5, wherein the mineral acid solution and the organic acid solution are in a ratio of 9:1 to 1:1, by volume of the solutions.

Embodiment 7. The method of any one of Embodiments 1-6, wherein the stimulation operation comprises matrix acidizing or acid fracturing.

Embodiment 8. The method of any one of Embodiments 1-7, wherein the subterranean formation comprises a carbonate reservoir.

Embodiment 9. The method of any one of Embodiments 1-8, wherein a recovery of the treatment fluid or a spent variant of the treatment fluid from the subterranean formation is 50% or greater after a shut in period in the subterranean formation.

Embodiment 10. The method of any one of Embodiments 1-9, wherein the oleaginous liquid comprises a terpene, a hydrocarbon, a fatty acid ester, or any combination thereof.

Embodiment 11. The method of any one of Embodiments 1-10, wherein the fatty alkyl alcohol ethoxylate comprises a linear or branched $C_6$-$C_{18}$ alcohol ethoxylate comprising 3 to 30 ethoxylate repeat units.

Embodiment 12. The method of any one of Embodiments 1-11, wherein the fatty alkyl ethoxylated ammonium salt is present and comprises at least one functionalized alkyl group having 3 to 30 ethoxylate repeat units.

Embodiment 13. The method of any one of Embodiments 1-12, wherein the zwitterionic surfactant is present and comprises a $C_{12}$-$C_{18}$ betaine, a $C_{12}$-$C_{18}$ sultaine, or any combination thereof.

Embodiment 14. The method of any one of Embodiments 1-13, wherein the alkyl ether sulfate salt or the alkyl ether sulfonate salt is present and comprises an ammonium salt.

Embodiment 15. The method of any one of Embodiments 1-14, wherein the co-solvent comprises an alcohol, a glycol, a glycol ether, a glycol ester, or any combination thereof.

Embodiment 16. The method of any one of Embodiments 1-15, wherein the treatment fluid is emulsified or foamed.

Embodiment 17. The method of any one of Embodiments 1-16, wherein the treatment fluid forms an emulsion, and wherein the emulsion comprises a microemulsion or a nanoemulsion.

Embodiment 18. The method of Embodiment 17, wherein the emulsion has an average particle size of 3 nm to 5000 nm.

Embodiment 19. The method of any one of Embodiments 1-18, wherein the retardation additive has a volume concentration in the treatment fluid of 0.5 gallons per thousand (gpt) to 5 gpt, based on an overall volume of the treatment fluid.

Embodiment 20. The method of any one of Embodiments 1-19, wherein the retardation additive has a volume concentration in the treatment fluid of 2 gallons per thousand (gpt) to 5 gpt, based on an overall volume of the treatment fluid.

Embodiment 21. A treatment fluid comprising: an aqueous acid solution comprising a mineral acid and an organic acid; and a retardation additive, wherein the retardation additive comprises: 1 wt % to 15 wt % of an oleaginous liquid; 5 wt % to 30 wt % of a fatty alkyl alcohol ethoxylate; 2 wt % to 40 wt % of at least one of a fatty alkyl ethoxylated ammonium salt, a zwitterionic surfactant, an alkyl ether sulfate salt, or an alkyl ether sulfonate salt; 4 wt % to 30 wt % of a co-solvent; and 10 wt % to 85 wt % of an aqueous fluid, each wt % based on a total mass of the retardation additive.

Embodiment 22. The treatment fluid of Embodiment 21, wherein the mineral acid comprises 10 wt % to 30 wt % hydrochloric acid solution, by total weight of the hydrochloric acid solution.

Embodiment 23. The treatment fluid of Embodiment 21 or 22, wherein the organic acid comprises methane sulfonic acid, glutamic acid diacetate, or any combination thereof.

Embodiment 24. The treatment fluid of any one of Embodiments 21-23, wherein the organic acid comprises an organic acid solution with an acid concentration of 10 wt % to 80 wt %, by total weight of the organic acid solution.

Embodiment 25. The treatment fluid of any one of Embodiments 21-24, wherein the mineral acid comprises a mineral acid solution and the organic acid comprises an organic acid solution, and wherein the mineral acid solution and the organic acid solution are in a ratio of 9:1 to 1:1, by volume of the solutions.

Embodiment 26. The treatment fluid of Embodiment 25, wherein the mineral acid solution and the organic acid solution are in a ratio of 9:1 to 1:1, by volume of the solutions.

Embodiment 27. The treatment fluid of any one of Embodiments 21-26, wherein the oleaginous liquid comprises a terpene, a hydrocarbon, a fatty acid ester, or any combination thereof.

Embodiment 28. The treatment fluid of any one of Embodiments 21-27, wherein the fatty alkyl alcohol ethoxylate comprises a linear or branched $C_6$-$C_{18}$ alcohol ethoxylate comprising 3 to 30 ethoxylate repeat units.

Embodiment 29. The treatment fluid of any one of Embodiments 21-28, wherein the fatty alkyl ethoxylated ammonium salt is present and comprises at least one functionalized alkyl group having 3 to 30 ethoxylate repeat units.

Embodiment 30. The treatment fluid of any one of Embodiments 21-29, wherein the zwitterionic surfactant is present and comprises a $C_{12}$-$C_{18}$ betaine, a $C_{12}$-$C_{18}$ sultaine, or any combination thereof.

Embodiment 31. The treatment fluid of any one of Embodiments 21-30, wherein the alkyl ether sulfate salt or the alkyl ether sulfonate salt is present and comprises an ammonium salt.

Embodiment 32. The treatment fluid of any one of Embodiments 21-31, wherein the co-solvent comprises an alcohol, a glycol, a glycol ether, a glycol ester, or any combination thereof.

Embodiment 33. The treatment fluid of any one of Embodiments 21-32, wherein the treatment fluid is emulsified or foamed.

Embodiment 34. The treatment fluid of any one of Embodiments 21-33, wherein the treatment fluid forms an emulsion, and wherein the emulsion comprises a microemulsion or a nanoemulsion.

Embodiment 35. The treatment fluid of Embodiment 34, wherein the emulsion has an average particle size of 3 nm to 5000 nm.

Embodiment 36. The treatment fluid of any one of Embodiments 21-35, wherein the retardation additive has a volume concentration in the treatment fluid of 0.5 gallons per thousand (gpt) to 5 gpt, based on an overall volume of the treatment fluid.

Embodiment 37. The treatment fluid of any one of Embodiments 21-36, wherein the retardation additive has a volume concentration in the treatment fluid of 2 gallons per thousand (gpt) to 5 gpt, based on an overall volume of the treatment fluid.

To facilitate a better understanding of the embodiments described herein, the following examples of various representative embodiments are given. In no way should the following examples be read to limit, or to define, the scope of the present disclosure.

Examples

Example 1: Formulations. Samples A-D were formulated by combining various blends of surfactants, oleaginous liquids, co-solvents, and water together as indicated in Tables 1-4 below. In general, the sequence of addition was in the order of water, then co-solvent (alcohol), then surfactant(s), and finally oleaginous liquid (solvent). After addition of the water, co-solvent, and surfactant(s), the resulting intermediate blend was mixed for 30 minutes in a blender or until the various components were dissolved together. Subsequently, the oleaginous liquid (Elevance HFS-10 (9-decenoic acid methyl ester) or D-limonene) was added, and the composition was mixed for an additional 10 minutes. A white or milky appearance appeared upon initial mixing in some cases, but upon further mixing, the composition clarified without layer formation or separation. An emulsion is believed to result at this stage.

TABLE 1

Sample A

| Order | Chemical | Quantity (wt %) |
|---|---|---|
| 1 | Deionized Water | 50% |
| 2 | Propylene glycol | 10% |
| 3 | $C_6$-$C_{10}$ alkyl ether sulfate ammonium salt | 20% |
| 4 | $C_{11}$-$C_{15}$ secondary alcohol ethoxylate, 5-9 EO units | 15% |
| 5 | D-Limonene | 5% |

TABLE 2

Sample B

| Order | Chemical | Quantity (wt %) |
|---|---|---|
| 1 | Deionized Water | 45% |
| 2 | Propylene glycol | 10% |
| 3 | $C_6$-$C_{10}$ alkyl ether sulfate ammonium salt | 30% |
| 4 | $C_{11}$-$C_{15}$ secondary alcohol ethoxylate, 5-9 EO units | 10% |
| 5 | D-Limonene | 5% |

TABLE 3

Sample C

| Order | Chemical | Quantity (wt %) |
|---|---|---|
| 1 | Deionized Water | 45% |
| 2 | Propylene glycol | 10% |
| 3 | $C_{12}$-$C_{14}$ alkyl dimethyl betaine (100%) | 30% |
| 4 | $C_{11}$-$C_{15}$ secondary alcohol ethoxylate, 5-9 EO units | 10% |
| 5 | D-Limonene | 5% |

TABLE 4

Sample D

| Order | Chemical | Quantity (wt %) |
|---|---|---|
| 1 | Deionized Water | 40% |
| 2 | Propylene glycol | 10% |
| 3 | $C_6$-$C_{10}$ alkyl ether sulfate ammonium salt | 30% |
| 4 | $C_{11}$-$C_{15}$ secondary alcohol ethoxylate, 5-9 EO units | 15% |
| 5 | D-Limonene | 5% |

Example 2: Dissolution testing. Treatment fluid formulations S1-S6 were created as detailed in Table 5. Corrosion Inhibitor (CI) 1 comprised an imidazoline-based material. Corrosion Inhibitor 2 comprised potassium iodide (KI), added in concentration of pounds per thousand gallon (pptg) of treatment fluid. Chelating Agent comprised L041 (an EDTA (ethylene diamine tetra acetic acid)-based agent) and Reducing Agent comprised L058 (a sodium erythorbate-based agent) (both available from Schlumberger). H2S Scavenger comprised M295 (available from Schlumberger) and is triazine-based. The retardation additive used, if present, was Sample C as detailed in Example 1 above.

TABLE 5

Treatment fluid formulations.

| Component | S1 | S2 | S3 | S4 | S5 | S6 |
|---|---|---|---|---|---|---|
| 28 wt % HCl (mL) | 188.1 | 100 | 100 | 120 | 140 | 160 |
| Water (mL) | 41.4 | 44.5 | 44.0 | 44.0 | 44.0 | 44.0 |
| 70 wt % MSA (mL) | 0 | 100 | 100 | 80 | 60 | 40 |
| Corrosion Inhibitor 1 (pptg) | 70 | 70 | 70 | 70 | 70 | 70 |
| Corrosion Inhibitor 2 (g) | 2.1 | 2.1 | 2.1 | 2.1 | 2.1 | 2.1 |
| Chelating Agent (g) | 1.5 | 1.5 | 1.5 | 1.5 | 1.5 | 1.5 |
| Reducing Agent (g) | 0.12 | 0.12 | 0.12 | 0.12 | 0.12 | 0.12 |
| $H_2S$ Scavenger (mL) | 0.5 | 0.5 | 0.5 | 0.5 | 0.5 | 0.5 |
| Retardation Additive (Sample C) (mL) | 0 | 0 | 0.5 | 0.5 | 0.5 | 0.5 |

Limestone core samples (Indiana limestone) with 0.5 inch thickness and 1.5 inch diameter, and a mass of 25 g to 35 g were weighed initially and data recorded. Core samples were added to 250 ml, volumes of Formulations S1-S6. Core samples were exposed to fluid formulations for 5 min at room temperature (about 22° C.) and subsequently removed, washed with water, dried, and weighed to determine final weight. CaCO3 dissolved was subsequently calculated based on weight data. Results of testing are shown in Table 6 below.

TABLE 6

Results of static dissolution testing.

| | S1 | S2 | S3 | S4 | S5 | S6 |
|---|---|---|---|---|---|---|
| Initial Mass (g) | 26.7010 | 27.7850 | 27.6212 | 28.6328 | 26.1328 | 28.0072 |
| Final Mass (g) | 21.0600 | 23.5860 | 24.3828 | 24.9416 | 22.3627 | 23.8160 |
| % CaCO3 Dissolved (by weight) | 21.1 | 15.1 | 11.7 | 12.9 | 14.4 | 15.0 |

As shown above, addition of retardation additive Sample C in Formulation S3 showed a decreased CaCO3 dissolution as compared to Formulations S1 and S2, indicating lower rock solubility, and thus a slower reaction rate of the acid with the core samples. Furthermore, in Formulations S3-S6, the ratio of mineral acid to organic acid was increased in ratio from 1:1 to 1.5:1 to 7:3 to 4:1. While CaCO3 dissolution % increased to 15 (for Formulation S6, 4:1 ratio of miner acid to organic acid), the volume of the costly organic acid component was reduced by 60% as compared to Formulation S3, and CaCO3 dissolution was still notably lower than in Formulation S1 (mineral acid only, no retardation additive).

Example 3: Coreflow Testing. Coreflow tests were performed in a coreflow apparatus using limestone cores (Indiana limestone) having a 12 inch length and 1.5 inch diameter and an average initial permeability to nitrogen gas of 1.5 to 2.4 md (millidarcy).

A dry limestone core was loaded in the coreflow apparatus, and a confining pressure of 4000 psi and back pressure of 3000 psi were applied to the core sample. The coreflow apparatus was heated to a temperature of 300° F. Acidizing fluids prepared were: Formulation S1, Formulation S2, Formulation S3, and Formulation S6 as shown in Example 2 above. Fluids were loaded into the coreflow apparatus. An injection rate of acidizing fluid of 5 mL/min was maintained. Differential pressure between the inlet and the outlet of the core was monitored through a transducer, and fluid was injected until transducer pressure indicated breakthrough. Pore volume injected at breakthrough was subsequently recorded. Testing results are shown in Table 7 below.

TABLE 7

Coreflow testing results.

| Formulation | Retarding Additive Included in Formulation | Pore Volume at Breakthrough |
|---|---|---|
| S1 | None | 0.27 |
| S2 | None | 0.24 |
| S3 | Sample C | 0.16 |
| S6 | Sample C | 0.23 |

As shown, Formulation S3 (including retardation additive Sample C) reduced pore volume needed until breakthrough as compared to Formulations S1 and S2 (including 28 wt % HCl and 28 wt % HCl+70 wt % MSA in a 1:1 volumetric ratio, respectively, with no retardation additive). As shown, Formulation S6 utilized 28 wt % HCl+70 wt % MSA in a 4:1 volumetric ratio and achieved the same volume of acid needed to achieve breakthrough with using less volume of MSA included (allowing for lower cost), as compared to Formulation S2.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled," or "coupled to," or "connected," or "connected to," or "attached," or "attached to" may indicate establishing either a direct or indirect connection and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A treatment fluid comprising:
   an aqueous acid solution comprising a mineral acid and an organic acid; and
   a retardation additive, wherein the retardation additive comprises:
   1 wt % to 15 wt % of an oleaginous liquid;
   5 wt % to 30 wt % of a fatty alkyl alcohol ethoxylate;

2 wt % to 40 wt % of at least one of an alkyl ether sulfate salt;

4 wt % to 30 wt % of a co-solvent; and 10 wt % to 85 wt % of an aqueous fluid, each wt % based on a total mass of the retardation additive, and wherein the retardation additive has a volume concentration in the treatment fluid of 0.5 gallons per thousand (gpt) to 5 gpt, based on an overall volume of the treatment fluid, and, wherein the treatment fluid forms an oil-in-water emulsion.

2. The treatment fluid of claim 1, wherein the mineral acid comprises 10 wt % to 30 wt % hydrochloric acid solution, by total weight of the hydrochloric acid solution, wherein the organic acid comprises methane sulfonic acid, glutamic acid diacetate, or any combination thereof, and wherein the organic acid comprises an organic acid solution with an acid concentration of 10 wt % to 80 wt %, by total weight of the organic acid solution.

3. The treatment fluid of claim 1, wherein the mineral acid comprises a mineral acid solution and the organic acid comprises an organic acid solution, and wherein the mineral acid solution and the organic acid solution are in a ratio of 9:1 to 1:1, by volume of the solutions.

4. The treatment fluid of claim 1, wherein the oleaginous liquid comprises a terpene, a hydrocarbon, a fatty acid ester, or any combination thereof.

5. The treatment fluid of claim 1, wherein the fatty alkyl alcohol ethoxylate comprises a linear or branched $C_6$-$C_{18}$ alcohol ethoxylate comprising 3 to 30 ethoxylate repeat units.

6. The treatment fluid of claim 1, wherein the fatty alkyl ethoxylated ammonium salt is present and comprises at least one functionalized alkyl group having 3 to 30 ethoxylate repeat units.

7. The treatment fluid of claim 1, wherein the zwitterionic surfactant is present and comprises a $C_{12}$-$C_{18}$ betaine, a $C_{12}$-$C_{18}$ sultaine, or any combination thereof.

8. The treatment fluid of claim 1, wherein the alkyl ether sulfate salt or the alkyl ether sulfonate salt is present and comprises an ammonium salt.

9. The treatment fluid of claim 1, wherein the co-solvent comprises an alcohol, a glycol, a glycol ether, a glycol ester, or any combination thereof.

\* \* \* \* \*